UNITED STATES PATENT OFFICE.

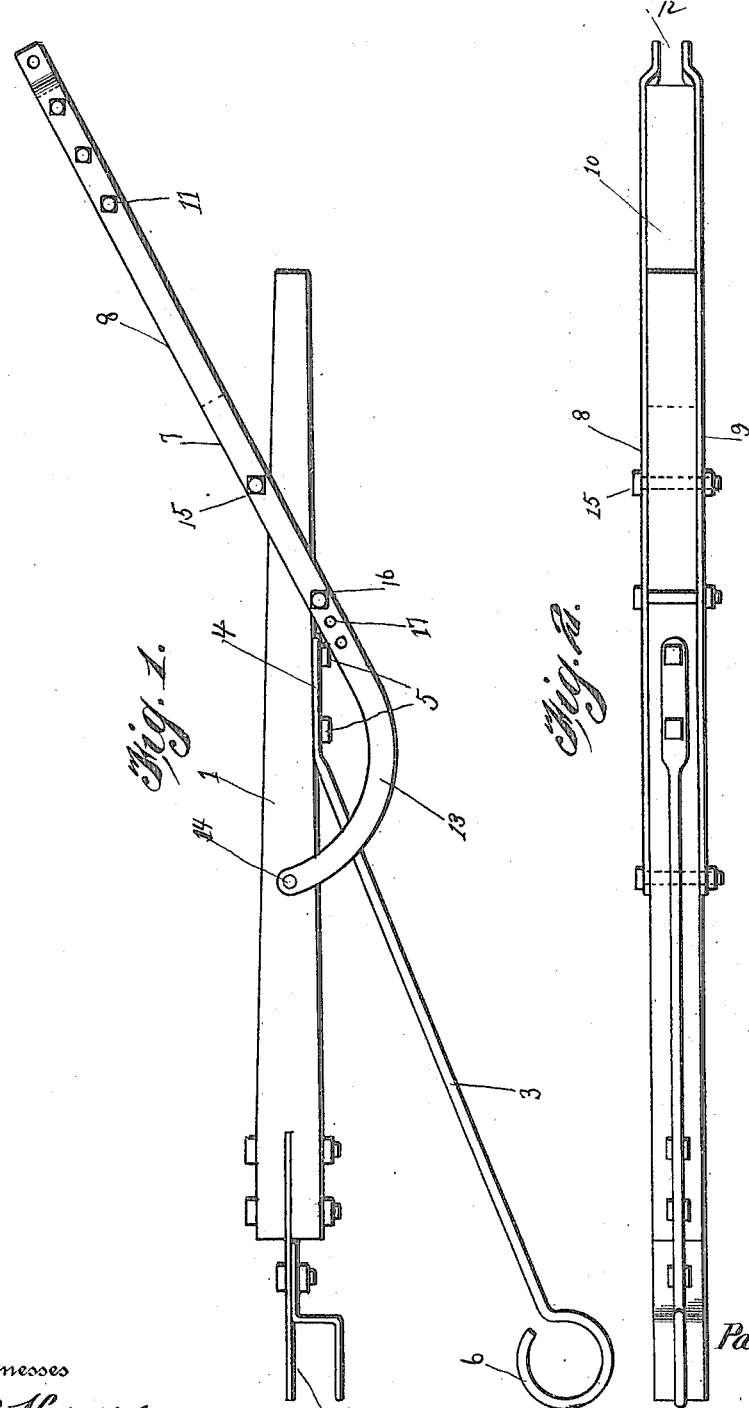

PAUL R. KUSSKE, OF SIBLEY, MINNESOTA.

DRAFT DEVICE.

1,135,116. Specification of Letters Patent. Patented Apr. 13, 1915.

Application filed August 24, 1914. Serial No. 858,367.

*To all whom it may concern:*

Be it known that I, PAUL R. KUSSKE, a citizen of the United States, residing at Sibley, in the county of Sibley and State of Minnesota, have invented certain new and useful Improvements in Draft Devices, of which the following is a specification.

My invention relates to a draft device designed particularly for attaching a grain binder to a "Bull" tractor, so that the binder will run in the grain and the tractor will travel outside or upon the stubble side of the grain to be cut.

The object of the invention is to provide a draft connection of the character described which is simple, reliable and efficient in construction and by slight modification is adapted for use in connecting various types of binders with a tractor of the character described.

A further object of the invention is to provide a draft device which may be attached at the proper angle to the draft tongue or pole of the binder, and may be adjusted to vary its angle of arrangement as occasion may require in its application to different binders or tractors.

A still further object of the invention is to provide a draft device which may be arranged at its point of attachment with the draft tongue or pole to accommodate and provide for the proper application of the usual members whereby the side draft is perfected.

The invention consists in the features of construction, combination and arrangement of parts hereinafter described and claimed, reference being had to the accompanying drawings, in which—

Figure 1 is a bottom plan view showing my improved draft device attached to the draft tongue or pole of a binder; Fig. 2 is a side elevation of the same.

Referring to the drawing, 1 designates a draft tongue or pole, provided at its rear end with a suitable type of coupling connection 2 for attachment to the binder, which coupling connection may vary in construction according to the make of binder to which the tongue or pole is to be attached. A brace rod 3 is arranged at one side of the tongue or pole and is provided with a flattened forward end 4 for the passage of bolts or screws 5, by which it is secured to the side of the tongue, the opposite end of said brace rod being provided with an eye 6 or otherwise formed for engagement with a connecting medium upon the binder. The body of the brace rod is arranged at the proper angle, according to the character or make of the binder, to reinforce the draft tongue or pole and to prevent injurious strain from the side draft.

The improved draft device comprises a pair of superposed draft irons 8 and 9. The forward ends of these draft irons are held spaced by a bar 10 secured thereto by bolts or equivalent fastenings 11, and the forward extremities of the draft irons are bent in proper relation to provide a coupling connection 12 for attachment to the "Bull" tractor.

The rear ends of the irons are curved, as shown at 13, and pivotally secured at their extremities by a bolt or the like 14 to the tongue or pole 1 at a point in rear of the attaching end 4 of the brace 3, the irons 8 and 9 being spaced to extend above and below the tongue and so as to receive and accommodate and admit of the passage of the forward end of the brace rod 3 between them and the application of such end of the brace rod to the tongue or pole at the proper point. The rear ends of the straight portions of the irons 8 and 9, at a point in advance of the curved portions 13, extend diagonally at a suitable angle across the tongue, the forward ends of the irons being arranged upon the stubble side of the tongue, while the curved ends 13 of the irons are located on the grain side of the tongue and provide for the arrangement of the forward end of the draft device at the proper angle on the stubble side and the pivotal connection of the curved ends 13 to the tongue at the proper point. A bolt 15 passes through the irons 8 and 9 on the stubble side and is arranged to engage the adjacent side of the tongue to hold the draft device from lateral movement in one direction, while a bolt 16 is provided to engage in one of a series of openings 17 in the irons on the grain side of the tongue to engage such side of the tongue and prevent lateral swinging motion of the draft device in the opposite direction, the adjustable connection of the bolt 16 with the several openings 17 permitting of the arrangement of the draft device at different angles to the tongue, according to the structure of the binder and angle at which it is to be connected with the tractor. It will thus be evident that the binder may be connected with the tractor so as to run in the grain, while the tractor travels on the stubble side or outside of the grain, and that the arrangement is such as to secure steady traction without excessive side draft, as well as an adjustment of the draft device to lie at different angles to the tongue, as occasion may require, under different conditions of service or the application of different types of binders to the tractor.

I claim as my invention:

In a device for coupling a binder to a tractor, the combination of a draft tongue or pole adapted to be connected with the binder, and a draft device comprising spaced members having portions contacting with the upper and under surface of the pole, said members having a pair of their adjacent end portions curved and pivotally connected to said pole and a pair of spaced bolts passing through the intermediate portion of said members and engaging spaced portions of said pole.

In testimony whereof I affix my signature in presence of two witnesses.

PAUL R. KUSSKE.

Witnesses:
C. H. MacKenzie,
Geo. A. McKenzie.

Copies of this patent may be obtained for five cents each, by addressing the "Commissioner of Patents, Washington, D. C."